A. CSIZMAR.
RAT TRAP.
APPLICATION FILED MAY 12, 1914.

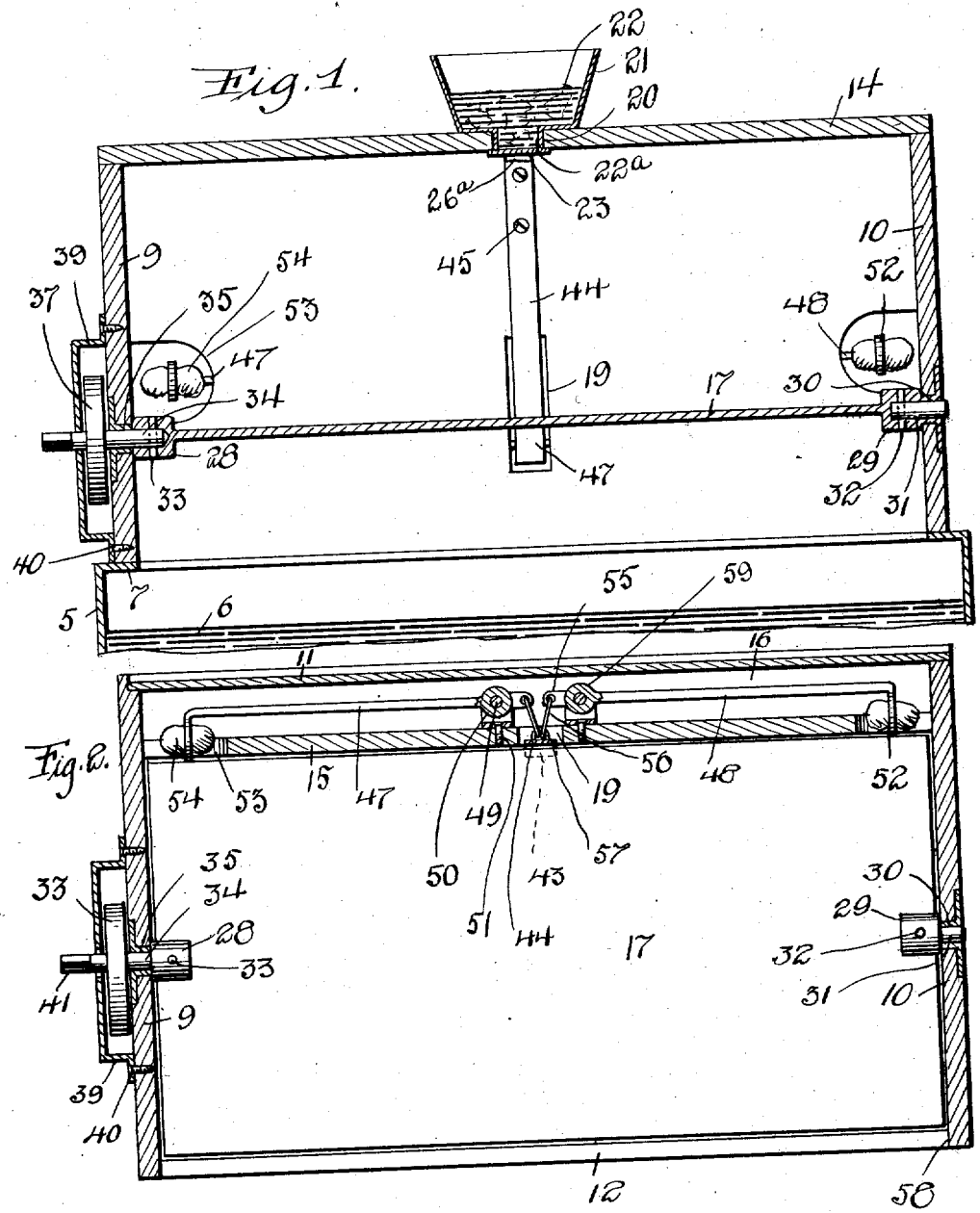

1,120,451.

Patented Dec. 8, 1914.
2 SHEETS—SHEET 2.

WITNESSES
Samuel Payne
Max H. Srlong

INVENTOR
A. Csizmar
By Henry C. Evert
ATTORNEY

UNITED STATES PATENT OFFICE.

ANDRAS CSIZMAR, OF DUQUESNE, PENNSYLVANIA.

RAT-TRAP.

1,120,451.      Specification of Letters Patent.      Patented Dec. 8, 1914.

Application filed May 12, 1914. Serial No. 838,186.

*To all whom it may concern:*

Be it known that I, ANDRAS CSIZMAR, a subject of the King of Hungary, residing at Duquesne, in the county of Allegheny and State of Pennsylvania, have invented certain new and useful Improvements in Rat-Traps, of which the following is a specification, reference being had therein to the accompanying drawing.

This invention relates to rat traps, and has for its object to provide a trap of such class, in a manner as hereinafter set forth, whereby the trap will be automatically reset after the rodent has been caught and discharged from a trap compartment.

A further object of the invention is to provide a rodent trap, with means for automatically supplying bait to the platform of a trapping compartment, when the platform has been released to discharge the rodent from said compartment.

Further objects of the invention are to provide a rat trap, which is simple in its construction and arrangement, strong, durable, efficient in its use, readily set up and comparatively inexpensive to manufacture.

With the foregoing and other objects in view, the invention consists of the novel construction, combination and arrangement of parts as hereinafter more specifically described and illustrated in the accompanying drawing, wherein is shown an embodiment of the invention, but it is to be understood that changes, variations and modifications can be resorted to which come within the scope of the claims hereunto appended.

Figure 3:
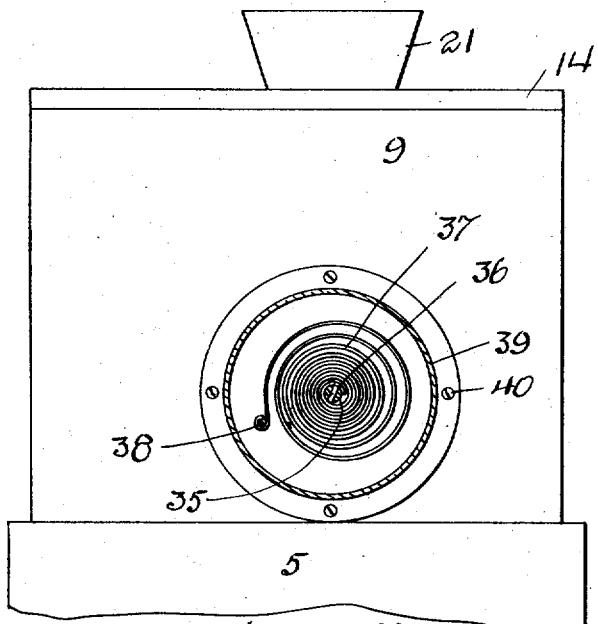
Figure 4:
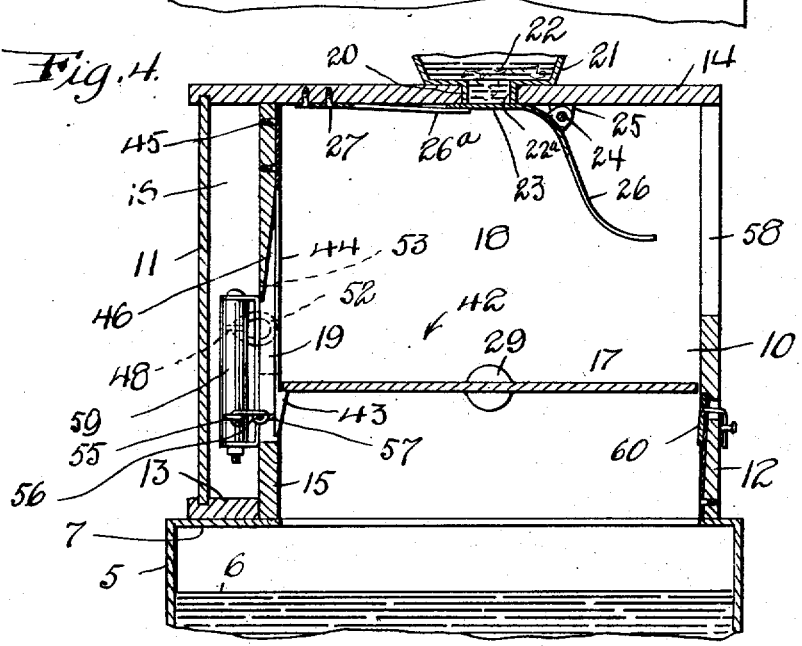

In the drawing wherein like reference characters denote corresponding parts throughout the several views: Figure 1 is a longitudinal sectional view of a rat trap in accordance with this invention. Fig. 2 is a sectional plan. Fig. 3 is an elevation, partly in section, and Fig. 4 is a cross sectional view.

Referring to the drawings in detail, 5 denotes a receptacle containing a body of water 6, and said receptacle 5 is open at its top and further provided with a continuous inwardly extending supporting flange 7. Mounted upon the flange 7 is a casing comprising end walls 9 and 10, and a rear wall 11, a front wall 12, a bottom plate 13 and a top 14. The casing further includes a partition plate 15, which extends from the top 14 and abuts against the bottom 13. The rear wall 11 is interposed between the top 14 and bottom 13, and is spaced from the partition plate 15. The rear wall 11 in connection with the partition plate 15, bottom 13 and top 14 forms a chamber 16, and the said partition plate 15, top 14, walls 9 and 10 and shiftable platform 17 provide a trapping compartment 18. The partition plate 15 is provided with an opening 19 for establishing communication between the chamber 16 and the compartment 18.

The bottom 13, partition plate 15, end walls 9 and 10 and front wall 12 are mounted upon the flange 7 and the trapping compartment 18 is mounted directly over the open top of the receptacle 5, whereby when the platform 17 is shifted a rodent will be precipitated therefrom into the receptacle 5 so that the rodent will be drowned in the body of water 6.

The top 14 is formed with an opening 20, which communicates with the trapping compartment 18 and mounted upon the top 14 is a receptacle 21, having an extension 22, which is mounted in the opening 20, and the said receptacle 21 contains a liquid bait 22. The extension 22 forms an outlet for the receptacle 21, and said outlet is normally shut by a pivoted spring controlled closure 23, the latter being pivoted at 24 to a hanger 25, which depends from the lower face of the top 14, and said closure 23 includes a downwardly curved arm 26, the latter projecting downwardly from the pivot 24. The closure 23 is normally maintained in position to shut the outlet formed by the extension 22, by one end of a spring 26, the latter having its outer end fixedly secured as at 27 to the lower face of the top 14. The spring 26 is permanently in engagement with the closure 23 and maintains said closure normally in position, shuts the outlet of the receptacle 21 and said closure remains in such position until it is tripped by the platform 17, in a manner as hereinafter set forth.

The platform 17 at each end thereof is provided with a bearing and the said bearings are indicated at 28 and 29. Fixed in the end wall 10, is a flanged collar 30, in which is journaled a pin 31, the latter extending into the bearing 29, and is fixed thereto as at 32. Fixed into the bearing 28 as at 33, is a spring actuated shaft 34, the latter projecting through a collar 35, fixed in the wall 9, and the said shaft 34 is connected as at 36, to a power transmitting spring 29, the latter being also attached as at 28, to the wall 9. The spring 37 is inclosed through the medium of a flanged cap 39, the latter being fixed to the outer face of the end walls 9 by the holdfast devices 40. The shaft 34 projects outwardly from the cap 39, and has its projecting end squared as at 40 to receive a suitable key for the purpose of winding the spring 37. The function of the spring 37 is to revolve the platform 17 in the direction of the error 42, and when the platform is revolved it engages the end 26 of the closure 23, and shifts the latter upon its pivot whereby a supply of liquid bait 22 from the receptacle 21 will be had to the platform.

The platform 17 is normally prevented from revolving by a latch 43 upon which one side of said platform seats as illustrated in Fig. 4, and said latch 43 includes a resilient shank 44, which is fixed by the holdfast devices 45 to the partition plate 15, and the said latch and its shank is arranged at the opening 19 in the plate 15. One wall opening 19 is beveled as at 46 to provide a clearance when the latch 43 is shifted to release the platform 17.

Arranged within the chamber 16 is a pair of oppositely disposed longitudinally extending bait holding members 47 and 48, and each of said members is pivoted in proximity to its inner end as at 49 to a bracket 50, secured as at 51 to the plate 15 and the said bracket 50 projects into the chamber 16. The outer end of each of the arms 47 and 48 is formed with a right angular extension 52 in the shape of a loop and the said extensions project through openings 53, in the plate 15 and into the compartment 18. A body of bait 54 is carried by each of the extensions 52, the inner end of each of the arms 47 and 48 is formed with an opening 55 and extending through said openings 55 is one end of a link 56, and the other end of the link 56 is attached to an eye 57 projecting from the latch 43.

The front wall 12 is provided with an entrance opening 58 for the rodent and it will be assumed that the rodent passes through said entrance into the trapping compartment 18 and travels upon the platform 17. Unless the arms 47, 48, or either one of them is or are shifted to release the latch 43, the platform 17 will not be shifted through the medium of the weight of the rodent. It will be assumed that the rodent attacks one of the baits 54, pulling the end 52 of the arm 48 inwardly, such action will shift the latch 53 clear of the platform 17, the spring 37 will then come into play and then revolve the platform, and the rodent will be precipitated into the body of water 6. As the platform 17 is revolved it will strike the extension 52 of the closure 23, rock the same upon its pivot and cause a discharge of the liquid bait upon the platform 17. When the rodent releases the bait, the latch 15 will be restored to normal position and such movement of the latch will be assisted by the weighted portions 59 of the inner end of the holding arms 47, and 48. The revolving movement of the platform 17 is retarded somewhat through the medium of the resiliently supported retarding device 60 carried by the wall 12.

What I claim is:—

1. A rat trap comprising a trap compartment, a normally locked revoluble spring controlled platform arranged within said compartment and forming the bottom thereof, a latch for normally locking said platform, a releasable mechanism actuated by the rodent for shifting the latch to free said platform whereby the latter will be automatically revolved, means connected with said platform for revolving it when said latch is shifted to released position, and means actuated by said platform for feeding a liquid bait to the platform when the latter is revolved.

2. A rat trap comprising a trap compartment, a normally locked revoluble spring controlled platform arranged within said compartment and forming the bottom thereof, a latch for normally locking said platform, a releasable mechanism actuated by the rodent for shifting the latch to free said platform whereby the latter will be automatically revolved, means connected with said platform for revolving it when said latch is shifted to released position, means actuated by said platform for feeding a liquid bait to the platform when the latter is revolved, and means for retarding the revolving movement of the platform.

In testimony whereof I affix my signature in the presence of two witnesses.

ANDRAS CSIZMAR.

Witnesses:
STEVE SHIPOSH,
M. C. BRIGGS.

Copies of this patent may be obtained for five cents each, by addressing the "Commissioner of Patents, Washington, D. C."